United States Patent
von Hippel

[15] 3,697,691
[45] Oct. 10, 1972

[54] ELECTRO-SENSITIVE PRINTING RESIN CONTROL SYSTEM

[72] Inventor: Eric A. von Hippel, Weston, Mass.

[73] Assignee: Graphic Sciences, Inc., Danbury, Conn.

[22] Filed: May 3, 1971

[21] Appl. No.: 139,890

Related U.S. Application Data

[63] Continuation of Ser. No. 747,001, July 23, 1968, abandoned.

[52] U.S. Cl. ........................178/94, 15/312, 55/521, 346/76
[51] Int. Cl. ...................................................H04l 15/24
[58] Field of Search.....178/93, 94; 346/74 CH, 74 E, 346/74 S, 74 SB, 74 JC, 76; 274/47; 55/521, 294; 15/312

[56] References Cited

UNITED STATES PATENTS

| | | | |
|---|---|---|---|
| 1,622,246 | 3/1927 | Clark | 15/312 X |
| 2,281,344 | 4/1942 | White | 19/109 |
| 2,586,014 | 2/1952 | Dunphy | 15/312 X |
| 2,739,029 | 3/1956 | Pollard et al. | 346/24 |
| 3,018,503 | 1/1962 | Hijiya et al. | 15/312 |
| 3,234,717 | 2/1966 | Korn | 55/521 X |
| 3,410,203 | 11/1968 | Fischbeck | 346/76 X |
| 3,458,977 | 8/1969 | Young et al. | 55/521 X |
| 2,511,837 | 6/1950 | D'Humy et al. | 137/6.6 |

FOREIGN PATENTS OR APPLICATIONS 1,077,718  8/1967  Great Britain...............15/312

Primary Examiner—Kathleen H. Claffy
Assistant Examiner—William A. Helvestine
Attorney—Blair, Buckles, Cesari & St. Onge

[57] ABSTRACT

A vacuum nozzle traveling over the surface of a document on which a reproduction is being made by a pyrographic stylus removes from the document waste particles produced during the reproduction process and transmits them through a rigid conduit to a filter unit located adjacent the document. The filter unit has a pair of deformable resilient foam slabs positioned in side-by-side abutting relationship on one of its walls to form an extended air-tight seal through which the coupling conduit enters the filter unit. As the nozzle moves over the surface of the document, the conduit moves along the length of the filter unit and the foam slabs continuously deform and reform snugly around the conduit as it moves to thereby maintain the vacuum within the filter unit.

13 Claims, 3 Drawing Figures

PATENTED OCT 10 1972

3,697,691

INVENTOR
ERIC A. VON HIPPEL

BY
Blair Buckles Cesari + St. Onge
ATTORNEYS

ELECTRO-SENSITIVE PRINTING RESIN CONTROL SYSTEM

This application is a continuation of U.S. Pat. application Ser. No. 747,001 filed July 23, 1968 by the same applicant and now abandoned. It is assigned to the same assignee.

BACKGROUND OF THE INVENTION

1. Field of the Invention

The invention relates to a particle and gas remover and more particularly to a particle and gas remover used in conjunction with a pyrographic stylus and incorporating an air filter for removing carbon particles and gas efflux from a document reproduction being made on a facsimile machine.

2. Prior Art

Air filters have long been used to remove particles and gaseous efflux from air which is flowed through them. These particles and gas are picked up by air which is drawn through a vacuum nozzle positioned adjacent a particle-bearing surface and are carried through a conduit to a filter unit containing an air permeable, activated, air filter which traps the particles carried to it by the air stream. An important use of cleaning systems is in facsimile transmission systems having pyrographic styli; these styli produce carbon particles and organic gas efflux that are advantageously removed by a vacuum system.

In some cases, the filter unit is movable with the conduit and the vacuum nozzle as a whole and the entire unit comprising the filter unit, conduit, and vacuum nozzle is moved over the surface to be cleaned. In other cases, it is more convenient to maintain the filter unit, and its driving motor, in a fixed position and move one or more portions of the vacuum nozzle over the surface. This is desirable, for example, in small, lightweight facsimile transmission systems. Generally, this is accomplished by providing a flexible conduit connecting the filter unit and the vacuum nozzle. This increases the bulk of the unit especially when the conduit is to be moved over a considerable distance. If an attempt is made to decrease the weight and bulk of the line by using a short, very flexible conduit, the increased stress in the shorter conduit hastens its ultimate failure and decreases the reliability of the system and its cost of maintenance.

In addition to obtaining a structure that is less cumbersome and less bulky than those heretofore available, it is also desirable to have a filter unit which may readily be removed for repair or replacement. To achieve this end, it is necessary that the air line connections to the filter unit be readily connected and disconnected and that the unit itself be easily and quickly located in its intended environment by personnel having minimal mechanical aptitude. In filter units available, it is often necessary to utilize special tools to mount the unit or to remove it from its environment, and such units are thus not convenient to use.

BRIEF SUMMARY OF THE INVENTION

Accordingly, it is an object of the invention to provide an improved particle and gas efflux removal system.

Further, it is an object of the invention to provide an improved removal system of the type having a nozzle which undergoes repetitive sweeping motion.

A further object of the invention is to provide an improved removal system having a moving vacuum nozzle connected to a filter unit by a rigid conduit.

A more specific object of the invention is to provide an improved removal system especially adapted for use in conjunction with a portable facsimile receiving apparatus having a pyrographic stylus.

Still another object of the invention is to provide an improved filter unit which is easily and quickly removed and replaced.

Yet another object of the invention is to provide a filter unit for use in a particle and gas efflux removal system having a rigid conduit connecting a vacuum nozzle to the filter unit.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

The particle and gas efflux removal system of the present invention has a nozzle for movably positioning adjacent the document-bearing surface of a facsimile receiver in order to remove particles from the document; a filter unit fixed in position with respect to the document-bearing surface and connected to an exhaust blower for drawing air through it; and a rigid conduit fixed to the nozzle and extending between the nozzle and the filter unit for transporting the particles and gas efflux from the nozzle to the filter unit. The nozzle surrounds a pyrographic stylus so that carbon particles and gas efflux produced by the stylus during reproduction of a document are immediately swept up into the nozzle.

The filter unit has an inlet chamber, an outlet chamber, and a filter chamber containing a folded filter providing multiple paths interconnecting the two. A portion of one wall of the inlet chamber is formed from a pair of extended slabs of foam, sponge, or other highly elastic material having opposed faces butted tightly against each other to form a generally air-tight seal. These opposed faces are compressible to receive a rigid conduit which extends through them into the interior of the inlet chamber to thereby couple the vacuum nozzle to the chamber. As the vacuum nozzle moves over a particle-bearing surface, the conduit moves along the plane defined by the opposing faces. In doing so, it compresses the elastic material in its path; this material snugly conforms to the periphery of the conduit as the conduit moves past a given section and then resumes its original shape to maintain a substantially air-tight seal for the inlet chamber.

A pair of runners or slides are mounted on side walls of the filter unit for mounting the chamber in a housing. The runners slide along mating ways in the housing to permit rapid removal of the chamber for inspection or replacement. A spring detent engages a recess in the filter unit to lock the unit tightly in the housing when in use but to permit rapid removal when desired simply by pulling on the filter unit.

BRIEF DESCRIPTION OF THE DRAWING

For a fuller understanding of the nature and objects of the invention, reference should be had to the follow

SPECIFIC DESCRIPTION OF THE INVENTION

Figure 1:
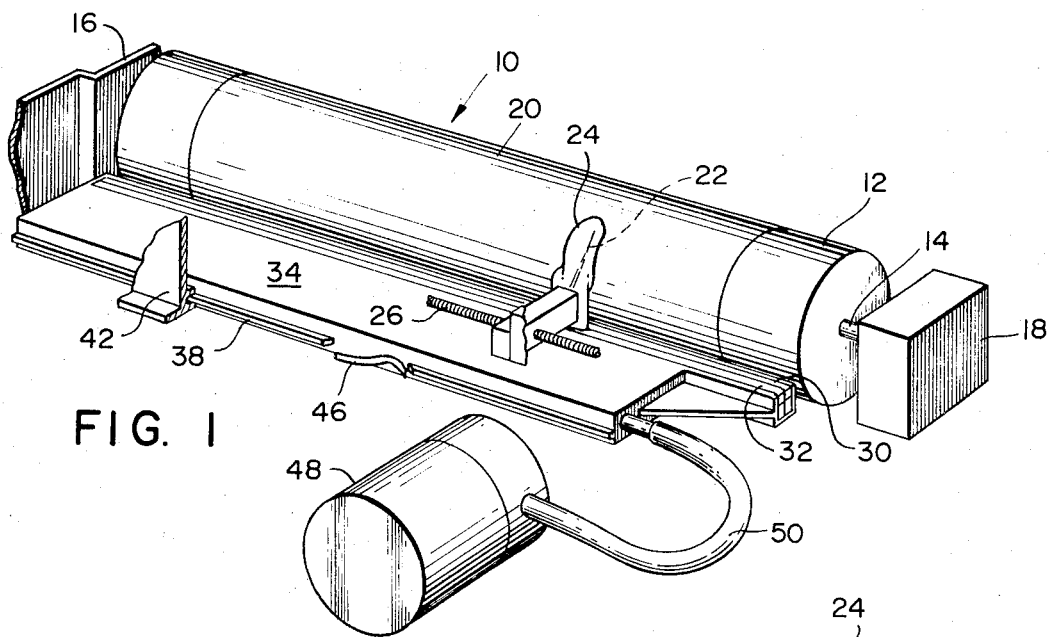
- FIG. 1 is a view in perspective of a particle and gas efflux removal system positioned for use in conjunction with a facsimile receiving system.

In FIG. 1, I have illustrated the reproducing portion 10 of a facsimile system having a rotating drum 12. The drum is mounted on a shaft 14 journaled in a support 16 at one end and in a gear box 18 at the other end. The gear box is connected to a driving motor (not shown) for rotating the drum 12. A document 20 mounted on the drum 12 has information reproduced on it by means of a stylus 22 mounted within a vacuum nozzle 24. The mouth of the nozzle has a curved lip which conforms generally to the curvature of the drum 12. The stylus 22 and nozzle 24 are connected to a lead screw 26 which advances them along the drum 12 in the direction of the arrows as the drum rotates. This linear motion combines with the rotary motion of the drum to produce a helical sweep of the document 20 by the stylus 22 and the nozzle 24. The stylus is connected to a source of electrical signals (not shown) which energize the stylus at selected times to reproduce information on the document. As the stylus sweeps across the document and writes on it, it produces carbon particles and organic gas efflux which are immediately swept up by the nozzle 24.

Figure 2:
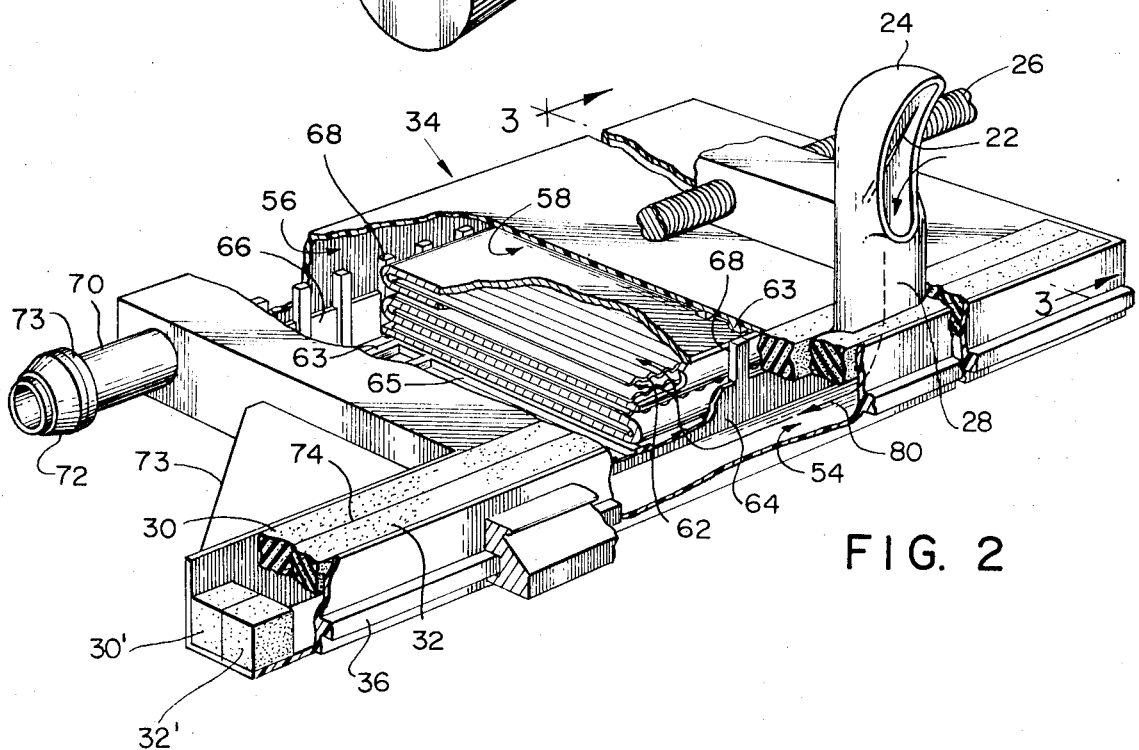
FIG. 2 is a view in perspective of the removal system of FIG. 1 in greater detail.

The nozzle 24 has a rigid conduit 28 extending downwardly through flexible walls 30 and 32 of a filter unit 34 which is shown in more detail in FIG. 2. At the left end of the filter unit 34 the walls 30 and 32 have extended portions 30' and 32' extending from the top of the chamber to the bottom so as to seal off both the top and the side of the filter unit. Along the rest of the unit the walls 30 and 32 extend only partway down from the upper face of the chamber so as to provide an open air flow path in the interior. The conduit 28 extends through the walls 30' and 32' when the filter unit is inserted into, or removed from, its environment. The unit 34 has runners 36 and 38 extending along the length of opposite side walls. These runners mate with corresponding ways in the housing 42 of the facsimile system to provide a means for rapidly inserting and removing the filter unit. The unit 34 is maintained in position by a spring detent 46; the detent 46 releases when the filter unit 34 is pulled outwardly along the runners 36 and 38. An exhaust blower 48 is connected to the filter unit 34 via an exhaust line 50.

Figure 3:
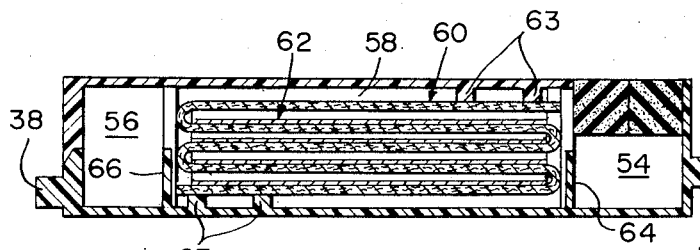
FIG. 3 is a transverse section along the lines 3—3 of FIG. 2.

FIG. 2 shows the filter unit 34 and vacuum nozzle 24 in greater detail. The nozzle 24 has a curved lip conformable to the surface of the drum against which it is positioned. This forms a high-velocity, low pressure peripheral sector around the stylus 22 which is mounted in the interior of the nozzle, thus causing the particles generated by the stylus to be ingested through the nozzle as soon as they are generated. The unit 34 has an inlet chamber 54, an exhaust chamber 56, and a filter chamber 58 containing a folded filter 60 stacked up in several layers. These layers are spaced apart from each other by means of corrugated sheets 62 positioned between them and forming air flow channels extending transversely across the filter unit from the inlet chamber 54 to the outlet chamber 56. The inlet and outlet chambers 54 and 56 respectively are separated from the filter chamber 58 by walls 64 and 66 respectively whose upper portions are in the form of fingers 68 to permit air to pass from the inlet chamber to the outlet chamber through the filter 60. As may be seen more clearly in FIG. 3, the fingers 68 extend slightly into the filter chamber 58 to space the filter 60 from the walls 64 and 66.

The outlet chamber 56 has a nozzle 70 connected to it at one end thereof; the nozzle terminates in a tapered plug 72 which connects to the exhaust line 50. The plug 72 is formed from a resilient, foamed material to form a seal around the nozzle when it is inserted into the conduit 50. A rigid ring 73 holds the plug 72 in place. A stiffener element 74 extends between an end wall of the filter chamber 58 and a wall of the inlet chamber 54 to provide a bending restraint for the extended portion of the latter chamber.

The walls 30 and 32 are formed from extended segments of elastic material having opposed faces butted against each other to form a relatively vacuum-tight seal around the conduit 28 which enters the chamber 54 through these walls. For example, these walls may be formed from a foamed, closed-cell plastic, a highly elastic rubber, or other elastic material which is sufficiently flexible to readily compress and form itself around the conduit 28. In the preferred embodiment shown in FIGS. 2 and 3, these opposed walls are planar and define a parting line 74 which is generally parallel to the direction of motion of the conduit 28. As the nozzle 24 moves along the drum in the direction of the arrows shown in FIG. 1, the rigid conduit 28 moves with it and the extension of this conduit through the walls 30 and 32 continuously separates the segments 30 and 32 along the parting line 74. These segments, being elastic, snugly conform themselves to the conduit 28 when the conduit is pressing them apart and immediately reform into opposed, abutting surfaces when the conduit has passed beyond them. As a result, an airtight seal is maintained around the conduit 28 as it moves from one end of the air filter 34 to the other.

From FIG. 2 of the drawing it will be noted that the conduit 28 has a horizontal cross section in the general shape of an ellipse having flattened sides. The major axis of the ellipse is parallel to the parting line 74 so that the segments 30 and 32 are parted by a rounded end of the conduit as it moves along the inlet chamber 54. This configuration reduces the resistance the segments 30 and 32 offer to motion of the conduit while ensuring a tight seal between these segments and the conduit. In practice, the cross section of the conduit may advantageously be formed in a rectangular shape with equilateral triangles each having a rounded tip formed on the end portions of the rectangle. Conduits having other cross sections, for example a round cross section, may also be used, but the resistance offered to their movement may be increased and the tightness of the seal may be decreased compared to that provided by a conduit of generally elliptical cross section.

The air flow pattern in the vacuum box is shown by the arrows 80 in FIG. 2. Air containing particulate material or gaseous efflux picked up from the document 20 adjacent the stylus 22 is drawn through the nozzle 24 and travels down the conduit 28 into the inlet chamber 54. At this point, the heavier particles of material in the air drop to the floor of the inlet chamber where they accumulate. Smaller particles of material are carried along with the air in the chamber 54 into the filter chamber 58 between the fingers 68 and thence through the passages defined by the corrugated spacers 62. During travesal of the filter chamber, some of the air flows directly through the passages defined by the corrugated chambers and out the end segments of the filter, while some of it travels upwardly or downwardly through the filter layers to passages defined by adjacent corrugated layers. In each case, as the air travels through a surface of the filter paper during its passage to the outlet chamber 56, the particulate material which is larger than the "pores" of the filter layer is trapped within the filter and does not pass through to the outlet chamber 56. By making the "pores" of the filter layer relatively small, therefore, nearly all the particulate material taken into the vacuum box 34 is removed from the air before it is vented to the atmosphere through the blower 48. Further, by utilizing a filter having "activated" charcoal impregnated in its surface, the gaseous efflux given off by organic components in the document used to form the reproduction are also trapped in the filter.

From the above it will be seen that I have provided a compact, efficient cleaning system for use in conjunction with a portable facsimile receiver using a pyrographic stylus. The cleaning system has a unique wall configuration which maintains an air-tight seal around a rigid, movable conduit which continuously communicates with the interior of a filter unit and which connects the nozzle to the filter unit. This unique seal allows the use of a rigid conduit and eliminates the weighty, bulky flexible hose which would normally be required to interconnect the vacuum nozzle and the filter unit and which would be especially subject to wear due to the continued expansion and compression of the hose segments as the nozzle traverses an extended distance with respect to the filter unit. Further, the configuration of the filter unit is especially adapted toward rapid and easy insertion in, and removal from, the environment in which it is intended to operate and is quickly and automatically locked in place when inserted in the appropriate housing.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A disposable filter unit for removing efflux generated by a reproducing stylus in a rotary drum facsimile machine, said filter unit comprising A. means forming an inlet chamber having an air-tight seal
   1. extending in a first direction for receiving therethrough a rigid conduit movable in said first direction with respect to said chamber,
   2. formed from first and second segments of elastic material, said segments
      a. defining opposed faces snugly butted against each other to form a parting plane therebetween,
      b. having a length dimension extending generally parallel to the direction of motion of said conduit, a width dimension extending perpendicular to this direction, and a thickness dimension extending perpendicular to said length and width dimensions and parallel to the parting plane,
      c. flexibly and snugly conforming to the conduit to form a generally air-tight seal therewith when said conduit is inserted therebetween in a direction corresponding to the thickness dimension,
      d. forming at least a portion of one wall of the inlet chamber,
B. means forming an outlet chamber for connection to an exhaust means for maintaining a fluid flow therethrough,
C. means forming a filter chamber connected between said inlet and outlet chambers and having a fibrous filter element disposed therein for removing efflux from fluid passing therethrough from said inlet chamber to said outlet chamber,
D. means for removably mounting said filter unit on said facsimile machine, comprising a pair of ribs extending along first and second faces of said filter unit, said ribs being adapted to made with corresponding ways on a housing in which said filter unit is to be mounted and having a recessed portion for receiving a spring arm therein whereby said filter unit may be slid into position along said ways and maintained in said position by said spring arm,
E. the inlet, outlet and filter chambers being formed integral with said filter unit to ensure that the seal and the filter element are removed and replaced whenever the filter unit is removed and replaced.

2. A filter unit according to claim 1 in which
A. the conduit and seal are so mounted with respect to the drum that the conduit traverses the drum
   1. in a direction parallel to the drum axis,
   2. with a first portion of the conduit adjacent the drum for removing efflux therefrom and
   3. a second portion of the conduit extending through said seal in a direction corresponding to its thickness dimension and moving along said seal in a direction corresponding to its length dimension to carry said efflux to said inlet chamber, and
B. the seal has an exposed end face transverse to its length dimension through which the second portion of the conduit slides when the filter unit is moved to, or removed from, proximity with said drum.

3. A cleaning system for removing efflux generated by a pyrographic stylus operating on a document positioned on a drum, said system comprising:

A. a nozzle
   1. for positioning adjacent said drum and movable along said drum in at least a first direction,
   2. a stylus mounted within said nozzle whereby said efflux is removed from said document immediately after it is generated thereon,
B. a rigid conduit connected to said nozzle and movable therewith; and
C. a filter unit
   1. removably mountable in a fixed location with respect to said drum,
   2. having an inlet chamber for communication with the nozzle, an outlet chamber for connection to an exhaust blower, and a filter chamber between said inlet and outlet chambers,
   3. having a flexible seal incorporated in at least a portion thereof and integral therewith for receiving said conduit therethrough to thereby connect said conduit in air-flow relating with the filter chamber,
   4. having a fibrous filter element in the filter chamber in the air-flow path between the inlet and outlet chambers and positioned to remove efflux from the air passing between said chambers,
   5. said inlet, outlet and filter chambers being enclosed within a common envelope defining said filter unit whereby said seal and said filter element are removed and replaced simultaneously when said filter unit is removed and replaced.

4. A cleaning system according to claim 3 in which said nozzle has a curved inlet portion generally conformable to the curvature of the drum whereby said nozzle forms a high-velocity, low-pressure peripheral sector surrounding said stylus for ingesting efflux generated thereby.

5. A cleaning system according to claim 3 in which the flexible seal in said filter unit is formed from a pair of extended slabs of elastic material having first and second opposed faces butted against each other to thereby define a partable slit providing access to the interior of the filter unit, said conduit being insertable through said slit and being movable along said slit, said slabs deforming around said conduit as it moves along said slit and reforming snugly around the contours of said conduit to thereby maintain an air-tight seal between said conduit and said filter unit during said motion.

6. A cleaning system according to claim 5 in which said slabs are formed from a foamed plastic material.

7. A cleaning system according to claim 6 in which the thickness dimension of the slabs is comparable to the width dimension of the slabs.

8. A cleaning system according to claim 5 in which the seal is so mounted in the filter unit that the unit exposes a face of the seal transverse to the direction of motion of the conduit through the seal through which the nozzle passes when the unit is positioned, in, or removed from, said fixed location whereby said unit may be installed or removed without altering the nozzle location.

9. A cleaning system according to claim 5 in which the outlet chamber terminates in an outward extending generally conical nozzle adapted for mating with a generally conical recess when the two are brought together, whereby the outlet chamber may be quickly connected to a vacuum exhaust element when the filter unit is positioned in said fixed location.

10. A cleaning system according to claim 3 in which said filter unit has a pair of ribs formed on first and second faces thereof and adapted to slide in mating grooves in a housing for mounting said unit, and a recessed portion on said unit for receiving the arm of a detent spring for locking said unit in position within said housing.

11. A cleaning system according to claim 3 in which said filter unit has an inlet portion, an outlet portion, and a filter portion, the seal forming a wall portion of the inlet portion for reception of said conduit therein, the outlet portion being connected to an exhaust blower for drawing air into said filter unit through said conduit and said filter portion enclosing said fibrous filter element.

12. A cleaning system according to claim 11 in which said filter is multiply folded on itself to form a plurality of filter layers within the filter chamber, each said layer being separated by a corrugated spacer element defining a plurality of air-flow paths interconnecting the inlet and outlet chambers, each said path extending through at least one portion of said filter whereby efflux may be removed from the sair flowing therethrough.

13. A cleaning system according to claim 3 which includes means for simultaneously moving said nozzle and said stylus with respect to said document.

* * * * *

UNITED STATES PATENT OFFICE
CERTIFICATE OF CORRECTION

Patent No. 3,697,691        Dated October 10, 1972

Inventor(s) Eric A. Von Hippel

It is certified that error appears in the above-identified patent and that said Letters Patent are hereby corrected as shown below:

Claim 1, paragraph D, 4th line, "adapted to made" should read -- adapted to mate -- .

Signed and sealed this 1st day of May 1973.

(SEAL)
Attest:

EDWARD M. FLETCHER, JR.
Attesting Officer

ROBERT GOTTSCHALK
Commissioner of Patents